(12) United States Patent
Tsuneyoshi

(10) Patent No.: US 8,907,507 B2
(45) Date of Patent: Dec. 9, 2014

(54) POWER GENERATOR DEVICE AND SWITCH

(75) Inventor: Nobutaka Tsuneyoshi, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 141 days.

(21) Appl. No.: 13/876,562

(22) PCT Filed: Oct. 3, 2011

(86) PCT No.: PCT/JP2011/072803
§ 371 (c)(1),
(2), (4) Date: Mar. 28, 2013

(87) PCT Pub. No.: WO2012/046704
PCT Pub. Date: Apr. 12, 2012

(65) Prior Publication Data
US 2013/0175806 A1    Jul. 11, 2013

(30) Foreign Application Priority Data

Oct. 4, 2010   (JP) ................. 2010-225212

(51) Int. Cl.
*F02B 63/04*  (2006.01)
*F02B 67/04*  (2006.01)
*H02K 7/18*   (2006.01)
*H01H 9/16*   (2006.01)

(52) U.S. Cl.
CPC ............ *H02K 7/1853* (2013.01); *Y02B 90/224* (2013.01); *Y02B 70/3241* (2013.01); *H01H 2300/03* (2013.01); *H01H 2239/076* (2013.01); *Y04S 20/227* (2013.01); *H01H 9/168* (2013.01); *Y04S 20/14* (2013.01)
USPC ...................................................... 290/1 E

(58) Field of Classification Search
CPC ....... H02K 7/1853; H02K 7/18; H01H 9/168; H01H 2300/03; H01H 2239/076; Y04S 20/14; Y04S 20/227; Y02B 90/224; Y02B 70/3241

USPC .......................................................... 290/1 E
See application file for complete search history.

(56) References Cited

U.S. PATENT DOCUMENTS 8,324,998 B2 *   12/2012   Takahashi et al. ............ 335/207
2013/0270092 A1 *  10/2013   Kaneko et al. ................ 200/501
2013/0270943 A1 *  10/2013   Tsuneyoshi et al. ............ 310/80

FOREIGN PATENT DOCUMENTS

| JP | 2003-056451 | 2/2003 |
| JP | 2005-039987 | 2/2005 |
| JP | 2005-102413 | 4/2005 |

OTHER PUBLICATIONS

International Search Report mailed on Nov. 22, 2011.

*Primary Examiner* — Javaid Nasri
(74) *Attorney, Agent, or Firm* — IPUSA, PLLC

(57) ABSTRACT

A power generator device includes a switch lever that is operated upon power generation, a power generator that generates an induced electromotive force when a driven unit is driven; and a power generation spring that accumulates an elastic force upon being applied an external force and outputs the accumulated elastic force to drive the driven unit. Further, the power generator device includes a sliding member and a pinwheel that are configured to transmit an operating force of the switch lever to the power generation spring while the switch lever is positioned between a pre-operation position and an accumulation complete position at which a predetermined elastic force is accumulated at the power generation spring, and disengage the engagement between the switch lever and the power generation spring and allow the power generation spring to output the accumulated elastic force when the switch lever moves past the accumulation complete position.

5 Claims, 6 Drawing Sheets

POWER GENERATOR DEVICE AND SWITCH

TECHNICAL FIELD

The present invention relates generally to a power generator device and a switch, and particularly to a power generator device that generates power through electromagnetic induction and a switch including such power generator device.

BACKGROUND ART

Various electronic devices that establish wireless communication using the 2.4 GHz radio wave frequency band are known. A wireless switch is one example of such an electronic device. The wireless switch may be arranged at a wall to be used to switch on/off a light, for example.

Such a wireless switch may use a battery or an indoor 100V power outlet as its power source. However, in the case where a battery is used, replacement of the battery may be burdensome. In the case where an indoor power outlet is used, the position of the wireless switch may be fixed so that the wireless switch cannot be freely moved. Thus, usability of the wireless switch is compromised in either case. Accordingly, techniques are being proposed for arranging a power generator device within the wireless switch.

For example, Patent Document 1 discloses a power generator device to be embedded within a small electronic device. The disclosed power generator device generates power by rotating a disk-shaped magnet within a coil to change the magnetic flux through the coil.

PRIOR ART TECHNICAL REFERENCE

Patent Reference

Patent Reference 1: Japanese Laid-Open Patent Publication No. 2005-102413

SUMMARY OF INVENTION

Problem to be Solved by the Invention

As is conventionally known, a power generator device may generate a stable induced electromotive force by instantaneously changing the magnetic flux within a coil. To enable the power generator device of Patent Document 1 to generate a stable induced electromotive force, a shaft connected to the coil has to be rotated at a high rotational speed so that the magnet within the coil may be rotated at a high speed.

When the above power generator device is used in a switch and the shaft is configured to be rotated by an operator, a stable induced electromotive force may not be obtained due to discrepancies in the rotational speed of the shaft depending on the operator. Also, when the switch is configured to be operated with fingers, the force applied to the switch by the fingers may not be sufficiently strong to instantaneously rotate the shaft to reach the electromotive force corresponding to the power source of the switch.

It is an object of at least one embodiment of the present invention to provide a power generator device that is capable of stably performing power generation regardless of the operating force of the operator.

Means for Solving the Problem

According to an embodiment of the presenting invention, a power generator device includes a case; an operating member that is operated upon power generation; a power generator part that generates an induced electromotive force when a driven part is driven; an elastic part that is connected to the driven part and is configured to accumulate an elastic force upon being applied an external force and output the accumulated elastic force to drive the driven part; and a connection disengagement mechanism that is configured to be engageable with the operating member and the elastic part. The connection disengagement mechanism interconnects the operating member and the elastic part and transmits an operating force of the operating member to the elastic part while the operating member is positioned between a pre-operation position and an accumulation complete position at which a predetermined elastic force is accumulated at the elastic part. The connection disengagement mechanism disengages the interconnection between the operating member and the elastic part and allows the elastic part to output the accumulated elastic force when the operating member moves past the accumulation complete position.

Advantageous Effect of the Invention

According to an aspect of the present invention, a power generator part is configured to be driven by an accumulated elastic force to generate an induced electromotive force so that stable power generation may be performed regardless of the operating force of the operator.

MODES FOR CARRYING OUT THE INVENTION

In the following, embodiments of the present invention are described with reference to the accompanying drawings.

FIGS. 1-4 are diagrams illustrating a switch 1 and a power generator device 10 according to an embodiment of the present invention. The switch 1 is a wireless switch that includes the power generator device 10 and a circuit board 20.

Figure 1:
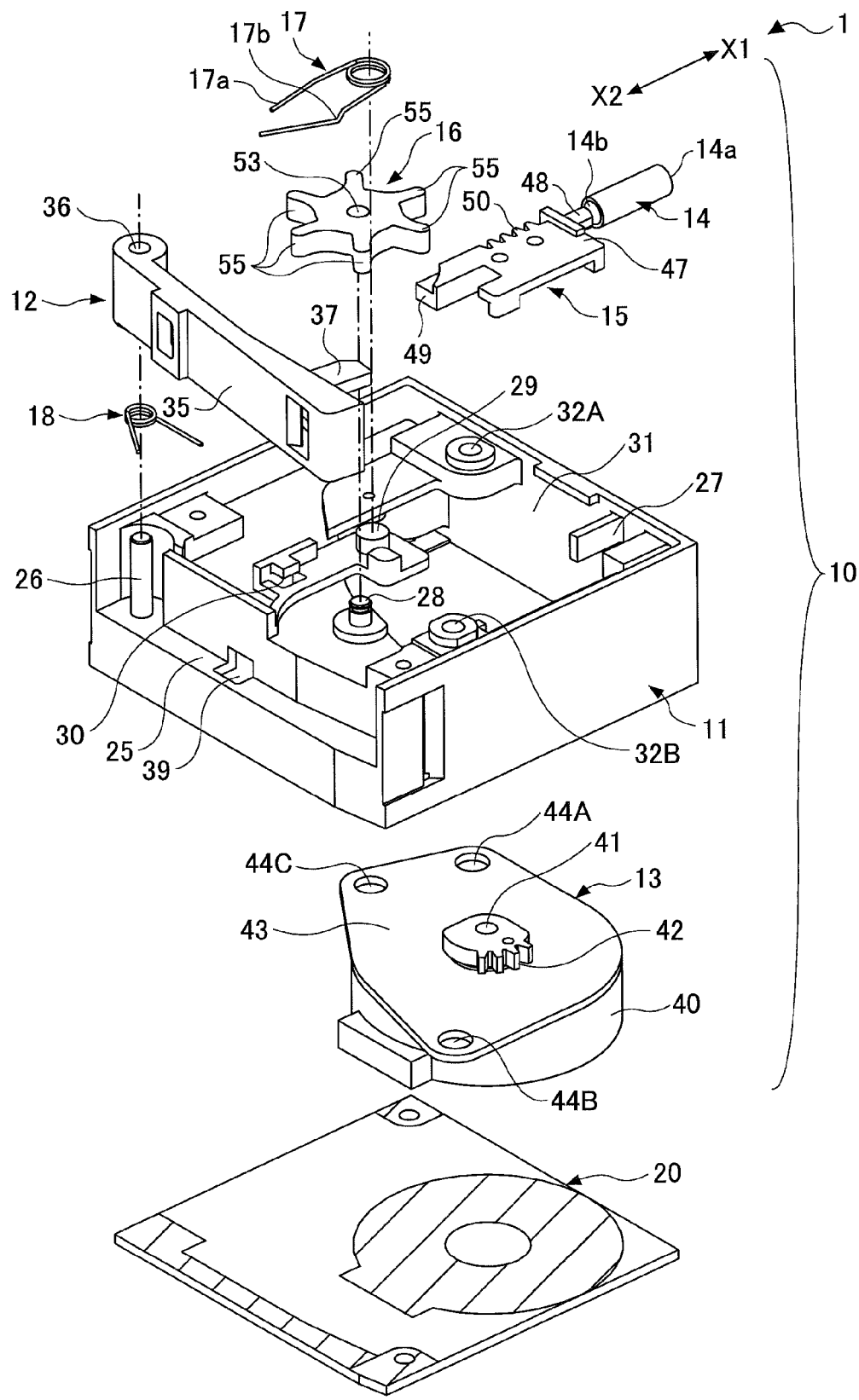
FIG. 1 is an exploded perspective view of a power generator device and a switch according to an embodiment of the present invention.
Figure 2:
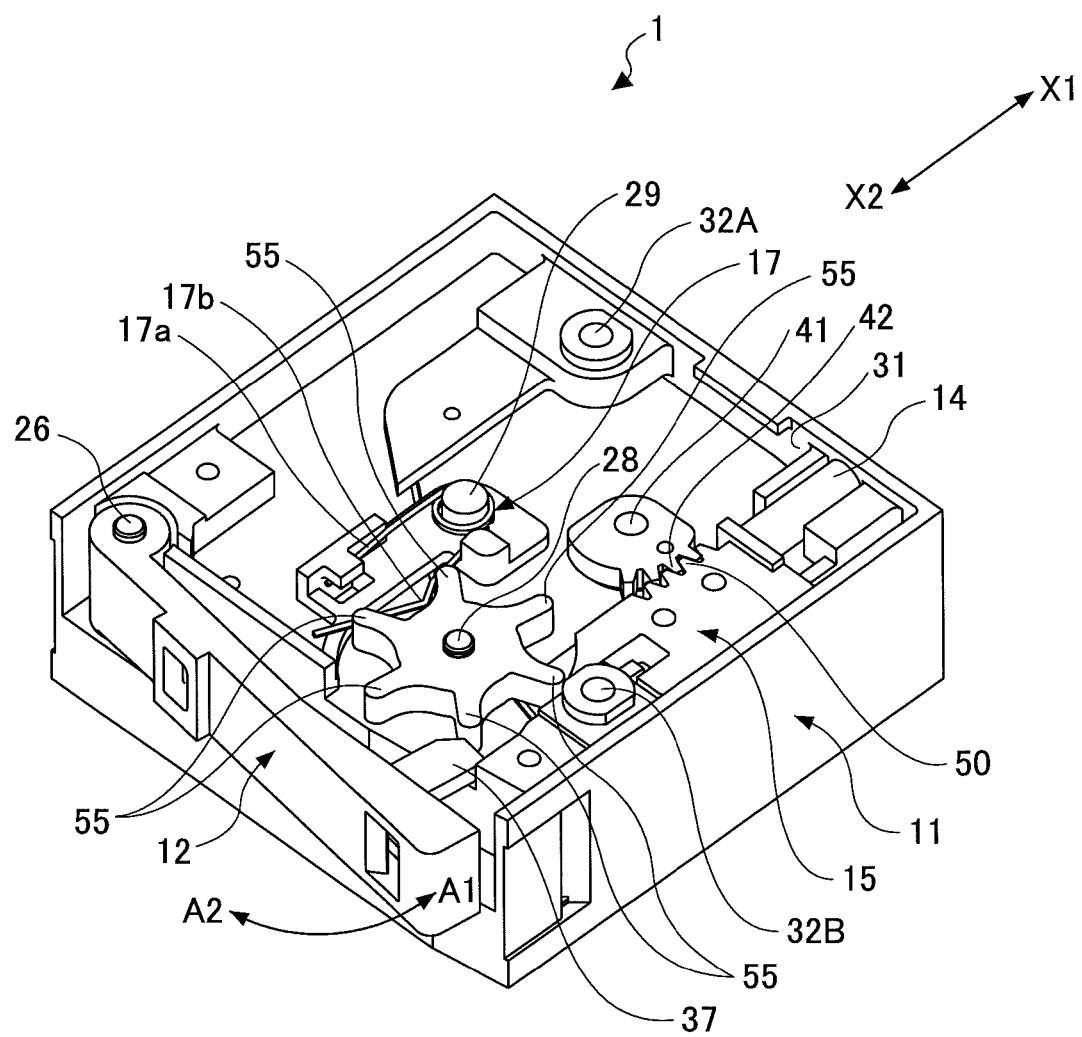
FIG. 2 is a perspective view of the power generator device and the switch from an upper side.
Figure 3:
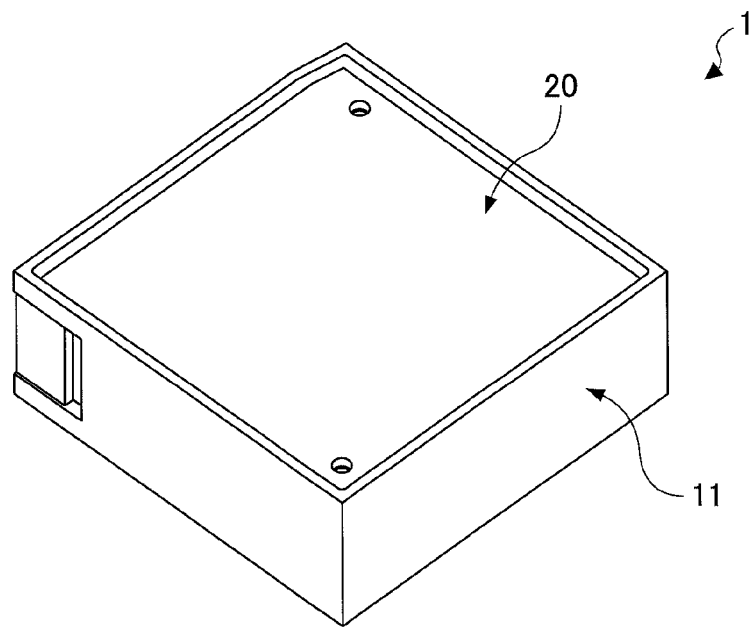
FIG. 3 is a perspective view of the power generator device and the switch from a lower side.
Figure 4:
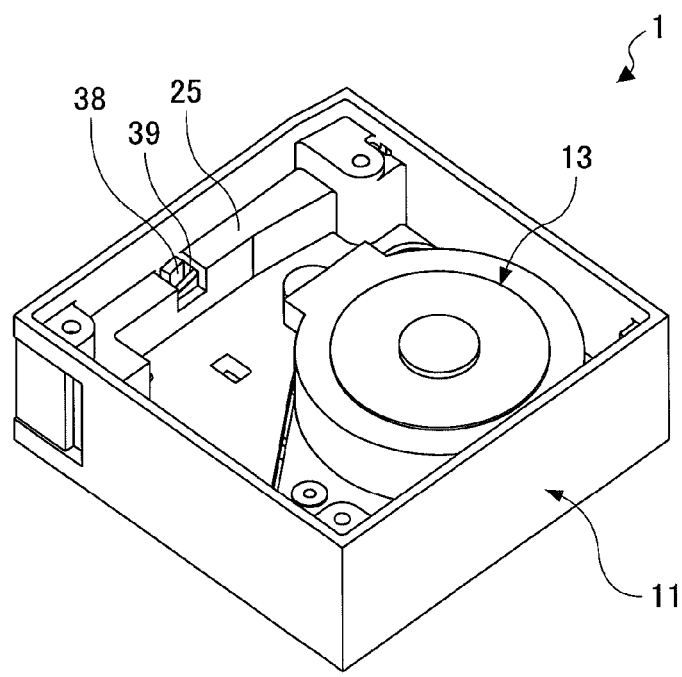
FIG. 4 is a perspective view of the power generator device and the switch from the lower side when a circuit board is removed.

The power generator device 10 is configured to generate power when a switch lever 12 is operated. The circuit board 12 includes a high frequency communication circuit (not shown) and is driven by an electric force (induced electromotive force) generated by the power generator device 20. The high frequency communication circuit is configured to transmit a radio wave of the 2.4 GHz band to an electrical appliance (e.g., lighting apparatus) upon being driven. In this way, on/off operations of the electrical appliance may be performed. As shown in FIG. 3, the circuit board 20 is arranged at the rear side of a case 11.

The power generator device 10 includes the case 11, the switch lever 12, a power generator 13, a power generation spring 14, a connection disengagement mechanism (15, 16), a pinwheel spring 17, and a switch return spring 18, for example.

The case 11 is a resin molded part that is arranged into a rectangular shape. A lever mounting concave part 25 for mounting the switch lever 12 is formed at one side of this case 11. The lever mounting concave part 25 accommodates a spindle 26 that axially supports the switch lever 12 and a lock groove 39 that engages a lock claw 38, which is described below.

The case 11 has various integrally formed parts including a spring mounting part 27 for mounting the power generation spring 14, a spring mounting shaft 29 for mounting the pinwheel spring 17, a spring engagement 30 that engages an end part 17a of the pinwheel spring 17, an opening part 31 where a driven part 41 is positioned when the power generator 13 is mounted, and bosses 32A and 32B for mounting the power generator 13.

The switch lever 12 is a resin molded part that has an operating part 35, a shaft hole 36, an engagement convex part 37, and the lock claw 38 that are integrally formed. The switch lever 12 is an embodiment of an operating member of power generator device according to the present invention.

The operating part 35 is a member that is operated by an operator upon power generation (i.e., turning on/off the switch 1). As described below, upon power generation, the operator pushes the operating part 35 in the direction indicated by arrow A1 (see FIGS. 2 and 5).

The shaft hole 36 is arranged at an end part of the switch lever 12 and is inserted through the spindle 26. In this way, the switch lever 12 is axially supported by the spindle 26 to be rotatable around the spindle 26 in the directions indicated by arrows A1 and A2.

In mounting the switch lever 12 to the spindle 26, the switch return spring 18 is also mounted to the spindle 26. The switch return spring 18 is arranged to urge the switch lever 12 to rotate in the direction indicated by arrow A2 of FIG. 5.

However, the lock claw 38 is formed at the lower side of the switch lever 12, and the lock claw 38 is configured to engage the lock groove 39 formed at the lever mounting concave part 25. By arranging the lock claw 38 to engage the lock groove 39, the switch lever 12 is prevented from rotating further in the A2 direction from the position illustrated in FIG. 2 (where the switch lever 12 is positioned slightly toward the A2 direction from the case 11).

The engagement convex part 37 is arranged to protrude from the opposite side of the operating part 35. The engagement convex part 37 is configured to be engageable with an engagement protrusion 55 of the pinwheel 16, which is described below.

In the following, the power generator 13 is described. The power generator 13 is an embodiment of a power generator part of the power generator device according to the present invention and includes a substrate 43 made of metal and a device mainframe 40 that is arranged on the substrate 43.

The device mainframe 40 includes the driven part 41 that is arranged to protrude from the upper side of the substrate 43. The power generator 13 is configured to rotate the driven part 41 so that a cylindrical magnet arranged inside a coil may be rotated. In this way, the magnetic flux through the coil may be changed and an induced electromotive power may be generated (i.e., power generation may be induced).

The substrate 43 includes plural mounting holes 44A-44C. Fixing screws (not shown) are inserted through the mounting holes 44A-44C, and the power generator 13 is fixed to the case 11 by screwing these fixing screws into the rear face of the bosses 32A and 32B and screw holes formed at the rear face of the case 11.

Also, the opening part 31 is formed at the position where the power generator 13 is to be mounted within the case 11. Thus, when the power generator 13 is fixed to the case 11, the driven part 41 protrudes within the opening part 31. Further, the driven part 41 includes a gear 42 that engages a rack 50, which is described below.

The power generation spring 14 is an embodiment of an elastic part. The power generation spring 14 is mounted to the spring mounting part 27 arranged at the case 11. In the present embodiment, a coil spring, which is a compression spring, is used as the power generation spring 14. However, the present invention is not limited to such an embodiment and some other type of elastic part that is capable of accumulating a predetermined elastic force (elastic energy) may be used as well. For example, other types of springs, an elastic member such as rubber, or an elastic mechanism using an air cylinder may be used as the elastic part.

The power generation spring 14 has an end part 14a at the X1 direction side (see FIGS. 1 and 2) that is fixed to the case 11 and an end part 14b at the X2 direction side that is connected to a slide member 15. Upon being compressed, the power generation spring 14 accumulates an elastic force and outputs the accumulated elastic force so that the driven part 41 of the power generator 13 may be rotated to induce generation of a predetermined induced electromotive force.

In the following, the connection disengagement mechanism is described. The connection disengagement mechanism includes the slide member 15 and the pinwheel 16. The connection disengagement mechanism is configured to be engageable with the switch lever 12 and the power generation spring 14.

The connection disengagement mechanism interconnects the slide member 15 and the power generation spring 14 to transmit an operating force of the slide member 15 to the power generation spring 14 while the slide member 15 is positioned between a start position at which operation of the slide member 15 is started (referred to as "pre-operation position" hereinafter) to a position where an adequate elastic force for driving the power generator 13 is accumulated at the power generation spring 14 (referred to as "accumulation complete position" hereinafter). After the slide member 15 moves past the accumulation complete position, the connection disengagement mechanism disengages the interconnection between the switch lever 12 and the power generation spring 14 to allow the power generation spring 14 to output the accumulated elastic force. In the following, configurations of the slide member 15 and the pinwheel 1 are described.

The slide member 15 is a resin molded part that includes a main part 47, a connection part 48, an engagement part 49, and the rack 50 that are integrally formed. The main part 47 is configured to be slidable in the X1 and X2 directions within the case 11.

The connection part 48 is arranged at the X1 direction side of the main part 47. The connection part 48 is connected to the end part 14b of the power generation spring 14. Thus, when the slide member 15 slides in the X1 direction, the power generation spring 14 is compressed to thereby accumulate an elastic force. When the compressed power generation spring 14 is elongated, the accumulated elastic force is output and the slide member 15 slides in the X2 direction.

The engagement part 49 is arranged at the X2 direction side of the main part 47. The engagement part 49 is configured to engage the engagement protrusion 55 of the pinwheel 16, which is described below. Further, the rack 50 is formed at a side part of the main part 47 and the rack 50 is configured to engage the gear 42 arranged at the driven part 41 of the power generator 13.

In this way, the power generator 13 and the slide member 15 are interconnected via the gear 42 and the rack 50. Thus, when the slide member 15 is slid in the X2 direction by the elastic force accumulated at the power generation spring 14, the driven part 41 is rotated via the rack 50 and the gear 42 so that the power generator 13 may generate an induced electromotive force.

Figure 5:
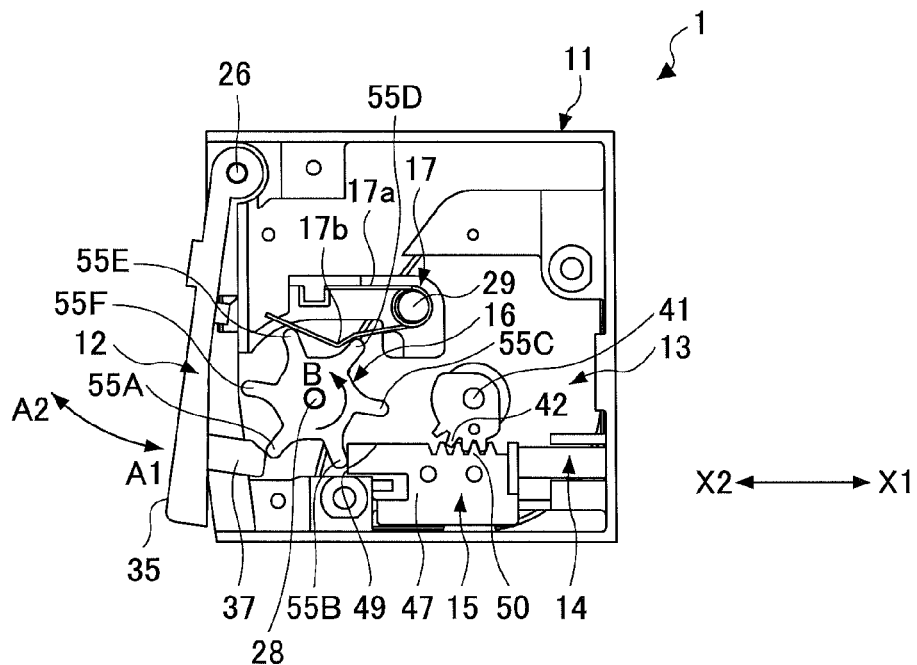
FIG. 5 is a diagram illustrating operations of the power generator device and the switch.

The pinwheel 16 is a resin molded part that includes the engagement protrusions 55 (six are arranged in the present embodiment) that extend in radial directions. It is noted that in the following descriptions, the engagement protrusions 55 may individually be referred to as engagement protrusions 55A-55F as illustrated in FIG. 5.

The pinwheel 16 has a shaft hole 53 formed at its center and this shaft hole 53 is inserted through a wheel shaft 28 formed at the case 11. In this way, the pinwheel 16 is rotatably mounted to the case 11.

When the switch lever 12 is operated, one of the engagement protrusions 55 (engagement protrusion 55A of FIG. 5) engages the engagement convex part 37, and the engagement protrusion 55 adjacent to the above engagement protraction 55 (engagement protrusion 55B of FIG. 5) engages the engagement part 49 of the slide member 15. Thus, when the switch lever 12 is operated, the switch lever 12 and the power generation spring 14 are interconnected via the pinwheel 16 and the slide member 15.

The pin wheel spring 17 is arranged near the pinwheel 16. Specifically, the pinwheel spring 17 is arranged at the opposite side of the wheel shaft 28 with respect to the position at which one of the engagement protrusions 55 of the pinwheel 16 engages the engagement convex part 37 and the engagement part 49. The pinwheel spring 17 is a torsion spring and is mounted to a spring mounting shaft 29 formed at the case 11.

The end part 17a of the pinwheel spring 17 is engaged and fastened to the spring engagement 30. The other end of the pinwheel spring 17 is bent to form an angle part 17b. The angle part 17b is configured to elastically urge the engagement protrusion 55, and in this way, the pinwheel 16 may be urged to rotate in the direction of arrow B shown in FIGS. 5-10.

It is noted that although six (6) engagement protrusions 55 are arranged at the pinwheel 16 in the above illustrated example, the number of engagement protrusions 55 arranged at the pinwheel 16 is not limited to this example. That is, any number of engagement protrusions 55 between four (4) and ten (10) may be arranged at the pinwheel 16. It is noted that when less than four (4) engagement protrusions 55 are arranged at the pin wheel 16, it may be difficult to interconnect the switch lever 12 and the power generation spring 14. When eleven (11) or more engagement protrusions 55 are arranged at the pinwheel 16, the engagement protrusions 55 may be too narrow so that adequate mechanical strength may not be secured.

In the following, operations of the power generator device 10 having the above-described configuration are described.

FIGS. 5-10 are diagrams illustrating operations of the power generator device 10 upon power generation. FIG. 5 illustrates a pre-operation state before the switch lever 12 is operated. In the pre-operation state illustrated in FIG. 5, the switch lever 12 is urged to rotate in the direction of arrow A2 by the elastic force of the switch return spring 18. The lock claw 38 engages the lock groove 39 so that the switch lever 12 is prevented from rotating further in the A2 direction from the pre-operation position illustrated in FIG. 5.

In the pre-operation state illustrated in FIG. 5, the power generation spring 14 is elongated so that no elastic force is accumulated at the power generation spring 14. The slide member 15 is moved toward the direction of arrow X2. The pinwheel 16 has the engagement protrusion 55A engaging the engagement convex part 37 of the switch lever 12 and the engagement protrusion 55B engaging the engagement part 49 of the slide member 15. Thus, the switch lever 12 and the power generation spring 14 are interconnected via the slide member 15 and the pinwheel 16 in the pre-operation state.

Figure 6:
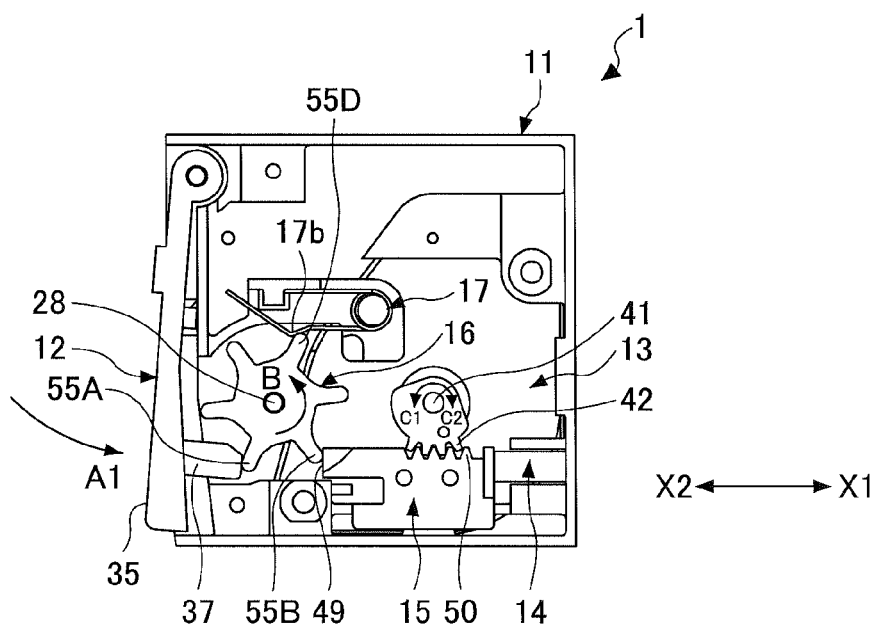
FIG. 6 is a diagram illustrating operations of the power generator device and the switch.

FIG. 6 illustrates a state where operation of the switch lever 12 toward the direction of arrow A1 is started. When the switch lever 12 is operated toward the A1 direction against the spring force of the switch return spring 18, the engagement convex part 37 urges the engagement protrusion 55A toward the X1 direction. Because the pinwheel 16 is rotatably mounted to the wheel shaft 28, the pinwheel 16 rotates in the direction of arrow B shown in FIG. 6 (counterclockwise direction) when the engagement protrusion 55A is urged by the engagement convex part 37.

In response to the rotation of the pinwheel 16, the engagement protrusion 55B that is adjacent to the engagement protrusion 55A and is in engagement with the engagement part 49 rotates, and the slide member 15 slides in the direction of arrow X1 as a result.

When the slide member 15 slides in the X1 direction, the power generation spring 14 that is connected to the slide member 15 is also urged to the move in the X1 direction. However, because the end part 14a of the power generation spring 14 is fixed to the case 11, the power generation spring 14 is compressed and accumulates an elastic force.

Also, when the slide member 15 slides in the X1 direction, the driven part 41 slightly rotates via the rack 50 and the gear 42. However, because the operating force from operation of the slide member 15 by an operator is relatively small and unstable, effective power generation by the power generator 13 may not be induced.

When the pinwheel 16 rotates in the B direction, the engagement protrusion 55D pushes the angle part 17b of the pinwheel spring 17. In this way, an elastic urging force in a direction opposite the B direction is applied to the pinwheel 16. Because this elastic urging force is relatively small compared to the operating force operating the switch lever 12, the pinwheel 16 may not be rotated in the reverse direction (rotated in the direction, opposite the B direction) by the pinwheel spring 17.

Figure 7:
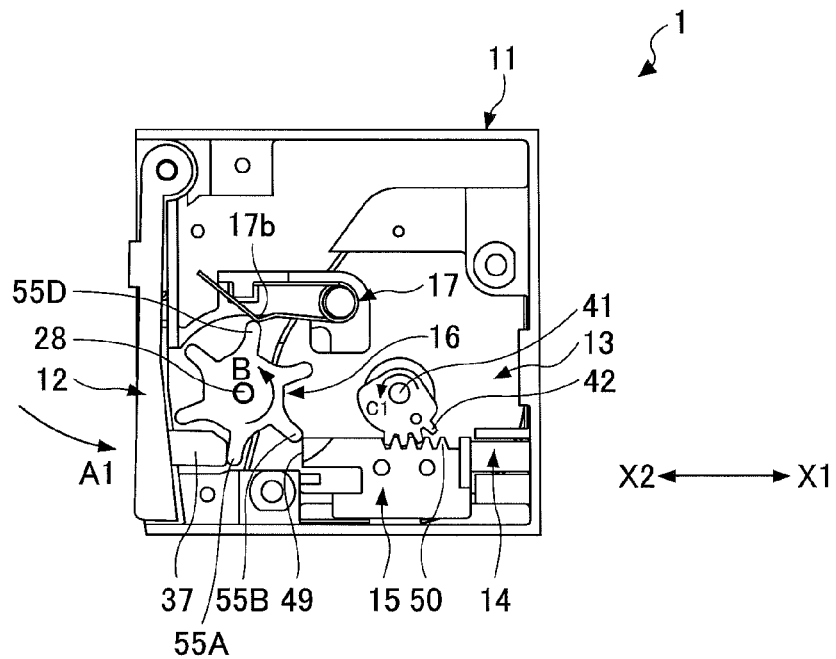
FIG. 7 is a diagram illustrating operations of the power generator device and the switch.

FIG. 7 illustrates a state where the switch lever 12 is moved to the accumulation complete position (referred to as "accumulation complete state" hereinafter). In the accumulation complete state illustrated in FIG. 7, the switch lever 12 is pushed inside the lever mounting concave part 25, and in turn, the slide member 15 is moved in the X1 direction up to a moving limit position. In the present embodiment, the power generation spring 14 is compressed substantially to its limit in the accumulation complete state illustrated in FIG. 7, and the power generation spring 14 accumulates an elastic force for driving the power generator 13 and inducing power generation by the power generator 13.

In the accumulation complete state illustrated in FIG. 7, the engagement protrusion 55B of the pinwheel 16 engages an edge part of the engagement part 49 of the slide member 15 and is in a state right before detaching from the engagement part 49. Also, in the accumulation complete state illustrated in FIG. 7, the engagement protrusion 55D is in contact with an apex part of the angle part 17b of the pinwheel spring 17.

Figure 8:
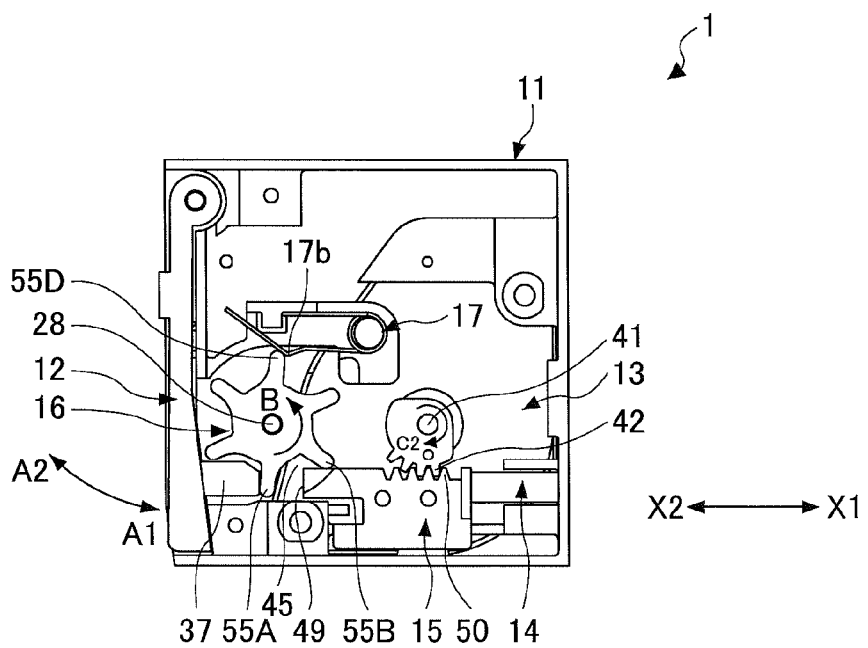
FIG. 8 is a diagram illustrating operations of the power generator device and the switch.

FIG. 8 illustrates a state where the switch lever 12 is moved past the accumulation complete position (referred to as "power generation state" hereinafter). When the switch lever 12 is pushed to reach the power generation state, the pinwheel 16 rotates further in the B direction and the engagement protrusion 55B detaches from engagement part 49. In this way, the interconnection between the switch lever 12 and the power generation spring 14 via the slide member 15 and the pinwheel 16 is disengaged.

It is noted that a space 45 is provided between the engagement protrusion 55A and the engagement protrusion 55B to enable the slide member 15 to move in the X2 direction. Thus, when the engagement protrusion 55B detaches from the engagement part 49, the slide member 15 is instantaneously slid toward the X2 direction by the elastic force (elastic energy) accumulated at the power generation spring 14.

Because the gear 42 and the rack 50 are engaged, the driven part 41 rotates in the direction of arrow C2 shown in FIG. 8 when the slide member 15 instantaneously slides in the X2 direction. In this way, the power generator 13 generates an induced electromotive force (performs power generation) by part of the elastic force of the power generation spring 14.

When power generation is performed, the connection between the power generation spring 14 (slide member 15) and the switch lever 12 is disengaged. Thus, only the elastic force (elastic restoring force) accumulated at the power generation spring 14 is applied to the slide member 15. The elastic force accumulated at the power generation spring 14 is strong enough for driving the power generator 13 to perform power generation. That is, upon power generation, the power generator 13 may be driven by a strong and stable elastic force output from the power generation spring 14 to thereby enable generation of a stable induced electromotive force.

As can be appreciated, in the power generator device 10 according to the present embodiment, the power generator 13 is driven by the accumulated elastic force instantaneously output from the power generation spring 14 to generate an induced electromotive force. In this way, a stable induced electromotive force may be obtained regardless of the operating force of the operator operating the switch lever 12. Also, by enabling the power generator 13 to stably generate an induced electromotive force, the high frequency communication circuit arranged at the circuit board 20 may stably transmit a radio wave to an electrical appliance so that on/off operations of the electrical appliance may be reliably performed.

Figure 9:
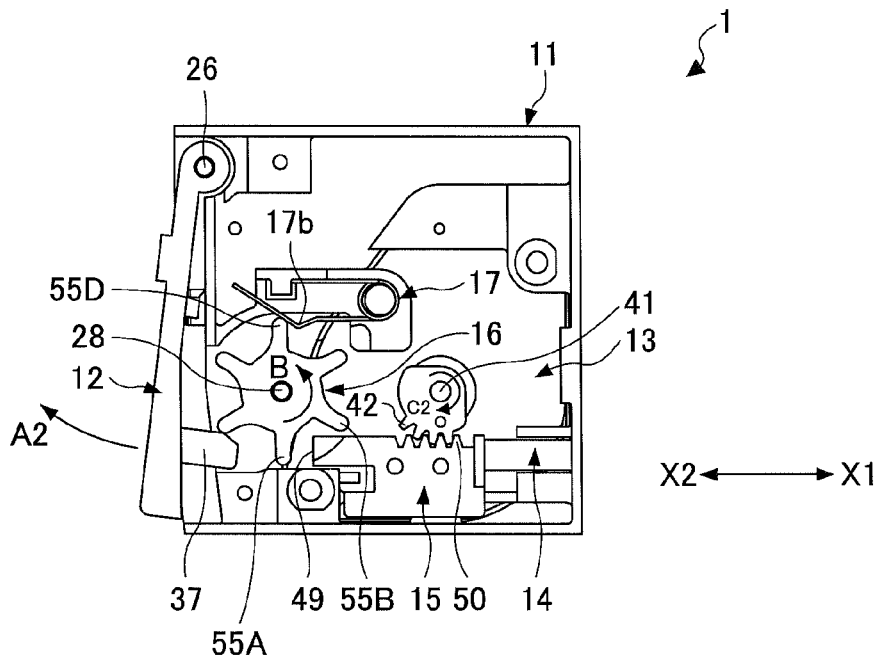
FIG. 9 is a diagram illustrating operations of the power generator device and the switch.

FIG. 9 illustrates a state after a power generation process is completed (referred to as "recovery process state" hereinafter). In the recovery process state illustrated in FIG. 9, the operation of the switch lever 12 in the A1 direction is released. As a result, the switch lever 12 is urged toward the A2 direction by the spring force of the switch return spring 18 to return to the pre-operation position.

The pinwheel 16 is detached from the slide member 15 so that it may freely rotate. At this point, the engagement protrusion 55D is elastically urged by the angle part 17b of the pinwheel spring 17. This in turn causes the pinwheel 16 to rotate in the B direction. The slide member 15 maintains its position at the X2 direction side, and the power generation spring 14 is maintained at the elongated state.

Figure 10:
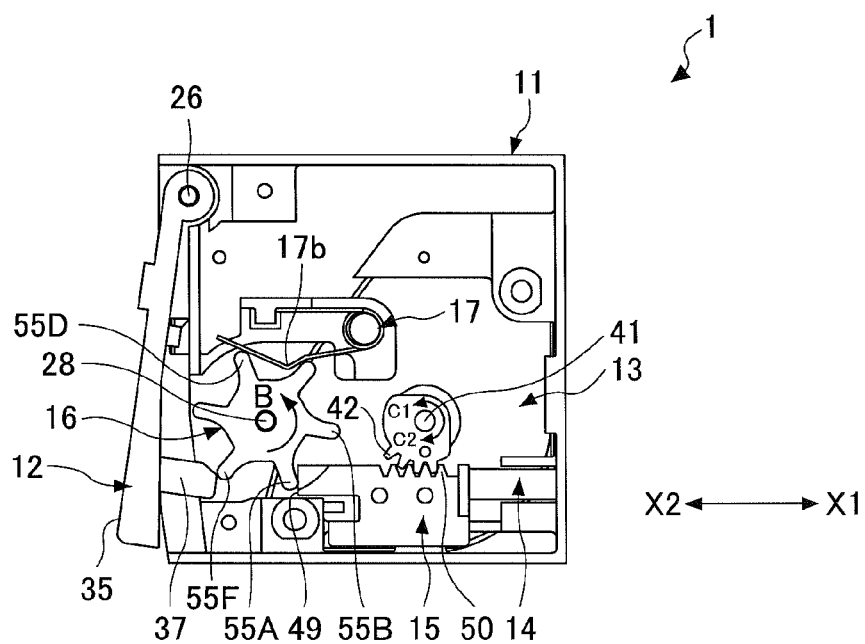
FIG. 10 is a diagram illustrating operations of the power generator device and the switch.

When the pinwheel 16 rotates in the B direction, the engagement protrusion 55F engages the engagement convex part 37 of the switch lever 12 and the engagement protrusion 55A engages the engagement part 49 of the slide member 15 as illustrated in FIG. 10. That is, the operation state of the power generator device 10 illustrated in FIG. 10 is equivalent to the pre-operation state illustrated in FIG. 5. That is, in the power generator device 10 according to the present embodiment, the pinwheel 16 is configured to rotate forward by 60 degrees after one power generation process is completed and return to the pre-operation state.

According to an aspect of the present embodiment, the power generator device 10 may reliably perform a power generation process with a relatively small number of components.

While certain preferred embodiments of the present invention have been described above, the present invention is not limited to these embodiment and various changes and modifications may be made without departing from the scope of the present invention.

The present application is based on and claims the benefit of priority to Japanese Patent Application No. 2010-225212 filed on Oct. 4, 2010, the entire contents of which are incorporated herein by reference.

The invention claimed is:

1. A power generator device comprising:
   a case;
   an operating member that is operated upon power generation;
   a power generator part that generates an induced electromotive force when a driven part is driven;
   an elastic part that is connected to the driven part and is configured to accumulate an elastic force upon being applied an external force and output the accumulated elastic force to drive the driven part; and
   a connection disengagement mechanism that is configured to be engageable with the operating member and the elastic part; wherein
   the connection disengagement mechanism interconnects the operating member and the elastic part and transmits an operating force of the operating member to the elastic part while the operating member is positioned between a pre-operation position and an accumulation complete position at which a predetermined elastic force is accumulated at the elastic part; and
   the connection disengagement mechanism disengages the interconnection between the operating member and the elastic part and allows the elastic part to output the accumulated elastic force when the operating member moves past the accumulation complete position.

2. The power generator device as claimed in claim 1, wherein the connection disengagement mechanism is rotatably mounted to the case and includes
   a pinwheel having plural engagement protrusions that extend in radial directions; and
   a slide member having one end part that is configured to engage the engagement protrusions and another end part that is connected to the elastic part, the slide member being slidably arranged within the case.

3. The power generator device as claimed in claim 2, wherein
   the power generator part is configured to generate the induced electromotive force by rotating the driven part;
   the driven part includes a gear; and
   the slide member includes a rack that engages the gear.

4. The power generator device as claimed in claim 2, wherein the number of the engagement protrusions is arranged to be greater than or equal to four and less than or equal to ten.

5. A switch comprising:
a power generator device as claimed in claim 1; and
an electronic circuit that is driven by the power generator device.

* * * * *